UNITED STATES PATENT OFFICE.

LEON LILIENFELD, OF VIENNA, AUSTRIA-HUNGARY.

ARTIFICIAL LEATHER AND PROCESS OF MAKING THE SAME.

1,140,174. Specification of Letters Patent. Patented May 18, 1915.

No Drawing. Original application filed December 11, 1912, Serial No. 736,222. Divided and this application filed July 11, 1914. Serial No. 850,384.

*To all whom it may concern:*

Be it known that I, Dr. LEON LILIENFELD, chemist, a subject of the Emperor of Austria-Hungary, residing at No. 1 Zeltgasse, Vienna, VIII, in the Empire of Austria-Hungary, have invented certain new and useful Improvements in Processes for the Manufacture of Artificial Leather, as will be hereinafter fully described.

The present invention relates to a new and improved process for the manufacture of artificial leather and the like and product of which the following is a specification.

Oils and fats and their derivatives and more especially castor oil, have chiefly been used as agents for imparting softness and elasticity in the manufacture of artificial leather from colloided cellulose ester masses.

Said oils and fats and more especially castor oil have a great number of disadvantages, such as to impart an unpleasant smell to the artificial leather, to be of limited durability, small resistance to heat and the like. A very important disadvantage is that an alternate arrangement of layers of colloided cellulose ester masses and viscose (cellulose xanthogenate) is not possible when oils and fats, and more especially castor oil, are employed as softening agents because such layers do not adhere to viscose, and vice versa.

The present invention is now based upon the fact that layers consisting of a matter of composition containing colloided cellulose ester masses and phenol esters which remain liquid at a temperature of 0° C. have a good adhesion to layers of viscose and especially to layers of viscose mixed with products which are obtained by treating aromatic amins with drying oils, especially Chinese wood oil in the presence of condensing agents, as described in my U. S. Letters Patent No. 1037158 and further that layers of viscose mixed with said products adhere likewise very well to layers consisting of colloided cellulose ester masses and the said phenol esters.

One object of the present invention is therefore a new and improved process for the manufacture of artificial leather and the like which consists in coating suitable materials with layers of a composition of matter containing a colloided cellulose ester mass and one or more phenol esters which remain liquid at a temperature of 0° C. alternating with layers composed of a mixture of viscose (cellulose xanthogenate) and the products obtained by treating drying oils, especially Chinese wood oil with aromatic amins in the presence of condensing agents.

Artificial leather and imitation wax cloth composed of layers of a colloided cellulose ester mass and phenol esters which remain liquid at 0° C., alternating with layers consisting of mixtures of viscose and products obtained by heating aromatic amins with drying oils, especially Chinese wood oil and a condensing agent, are products valuable in the art, and are distinguished by their softness, pliability and gloss, and also cheapness.

In carrying out the improved process nitrocellulose or celluloid or substitutes therefor in general any cellulose esters are dissolved in a suitable solvent, and to the solution there is added a phenol ester which remains liquid at 0° C. Ortho-tricresyl-phosphate has been found especially suitable for this purpose. This solution may be also mixed with other suitable binding agents (for instance, acetyl-cellulose, formyl-cellulose, caoutchouc, guttapercha, drying oils and the like) or with filling substances (for instance ground leather, powdered cork, asbestos, precipitated chalk, china clay, etc.) or with pigments or coloring matters or with other softening agents (such as oils, fats, especially castor oil, gylcerin, sugar, soaps and the like). The matter of composition thus obtained is applied to suitable foundation materials such as textile fabrics, paper, cotton or paper fleece or the like, by hand or by means of suitable machinery, or it may be rolled thereon. The application of the composition may be effected in one or more coats or layers. If the composition is applied in several layers the percentage either of nitrocellulose or celluloid or of phenol esters which remain liquid at 0° C. or of both may vary in any of the several layers.

Since the cellulose esters when only mixed with the said phenol esters and well kneaded yield compositions or pastes capable of being applied or rolled on, there is no need to use volatile solvents, or if such are used the quantity used may be very small.

The production of the crude or purified viscose is supposed to be known.

The mixtures of viscose with the products obtained from Chinese wood oil, aromatic amins and a condensing agent are prepared by mixing by stirring and kneading together crude viscose or viscose refined by any known means (for instance by treatment with common salt or sal-ammoniac or ammonium sulfate or other salts, or carbonic acid or alcohols or sodium bisulfite or sulfurous acid, or weak acids or other dehydrating agents, etc.) or a dissolved heavy metal salt of vicose (for instance a zinc compound of viscose which is soluble in alkalis or ammonia) with the products obtained from Chinese wood oil, aromatic amins and a condensing agent.

It has been found advantageous to prepare this mixture by adding the products of the Chinese wood oil and aromatic amins in the dissolved state to the viscose.

A solution or emulsion of such products prepared with the help of basic substances (alkalis, ammonia and the like), soaps or alkali salts or ammonium salts of the fatty sulfoacids (Turkey red oil, turkon oil and the like) and water, is especially suitable for this purpose.

The mixture of viscose with the product of Chinese wood oil and aromatic amins is then applied, with or without an admixture of coloring matters or pigments or filling substances (such as ground leather, finely powdered cork, asbestos, zinc white, precipitated chalk, etc.) and with or without other binding agents (such as glue, albumen, caoutchouc, resin, drying oils, etc.) or softening agents (such as glycerin, sugar, soaps, oils, etc.) in layers alternating with layers of the composition composed of a colloided cellulose ester mass and phenol esters which remain liquid at 0° C. upon suitable materials (such as fabrics, paper and the like) by hand or machinery.

After drying, the artificial leather thus made is either left to mature by storage for the purpose of rendering the viscose insoluble, or it is treated with substances that render viscose insoluble or it is exposed to steam or to dry heat. If viscose still containing impurities has been used, a final washing process is needed, consisting in treating the artificial leather either with water alone or with water and acids.

The improved process may, however, also be carried out by coating the material with the mixture of viscose and the product of Chinese wood oil and aromatic amins, rendering the viscose insoluble and freeing it from impurities and drying it in a known manner and then applying the layers or the mixture of a colloided cellulose ester mass and the phenol esters which remain liquid at 0° C.

The artificial leather thus produced may be satined or calendered either in layers or when finished. The completely finished artificial leather may be pressed or embossed with any desired leather markings or designs.

The following are examples of the manner in which this improved process may be carried out:

*Standard solution No. 1.*—60 parts by weight of alcohol, 30 parts by weight of acetone, 10 parts by weight of powdered celluloid, 10 parts by weight of ortho-tricresylphosphate.

*Standard solution No. 2.*—40 parts by weight of glacial acetic acid, 60 parts by weight of alcohol, 12 parts by weight of powdered celluloid, 12 parts by weight of ortho-tricresylphosphate.

*Standard emulsion No. 3.*—1000 parts by weight of a substance produced by heating 100 parts by weight of Chinese wood oil with 200 parts by weight of ortho-toluidin and 11 parts by weight of zinc chlorid, washing in water and drying, are, while being stirred and kneaded together, heated to water bath temperature, and then 550 parts by weight of soda-Turkey-red-oil of about 40 to 55 per cent. of dry residue and 6 to 10 per cent. of ash are added in several doses. Then 60 parts by weight of a soda solution of 50° Bé, are added in several doses, and finally the mass is diluted by kneading with 800 parts by weight of water. The finished solution or emulsion may then be strained for the purpose of freeing it from impurities.

*Standard solution No. 4.*—100 parts by weight of standard emulsion No. 3 are well mixed with 40 to 50 parts by weight of a raw viscose containing 13 per cent. of cellulose.

*Standard solution No. 5.*—100 parts by weight of standard emulsion No. 3 are well mixed with 75 to 100 parts by weight of a raw viscose containing 13 per cent. of cellulose.

*Artificial leather No. 1.*—A first layer consisting of one to six coats of the standard solution No. 4 or No. 5 with the addition of a pigment, a pigment-lake or a coloring matter is applied upon a suitable material such as a textile fabric and a second layer consisting of one to three coats of the standard solutions No. 1 or No. 2 are applied thereupon. When quite dry, the imitation leather is treated with hydrochloric or sulfuric acid of 5 to 10 per cent. strength, then thoroughly washed and again dried.

*Artificial leather No. 2.*—A first layer consisting of one to six coats of the standard solution No. 4 or No. 5 is applied to a textile fabric or the like. After drying the artificial leather is treated with steam or with a mineral acid of 5 to 10 per cent. strength and thoroughly washed and dried, whereupon a second layer consisting of one to three coats is given with the standard solution No. 1 or No. 2.

*Artificial leather No. 3.*—The same is made by applying four layers as follows: 1st layer (consisting of one to four coats) standard solution No. 4 or No. 5, 2nd layer (consisting of one to three coats) standard solution No. 1 or No. 2, 3rd layer (consisting of one to three coats) standard solution No. 4 or No. 5, 4th layer (consisting of one to three coats) standard solution No. 1 or No. 2.

Since this imitation leather contains viscose, it must also be treated either with steam or with a mineral acid or the like, and then washed.

The artificial leathers may be calendered or pressed at the finish or between the several layers and finally marked with any desired leather graining or other design.

What I claim as my invention and desire to secure by Letters Patent is:

1. The process for the manufacture of artificial leather and the like, which consists in coating suitable materials with layers composed of a colloided cellulose ester mass and a phenol ester which remains liquid at a temperature of 0° Cent. alternating with layers composed of a mixture of viscose (cellulose xanthogenate) and the products obtained from Chinese wood oil and aromatic amins in the presence of a condensing agent.

2. The process for the manufacture of artificial leather and the like, which consists in coating suitable materials with layers composed of a mixture of a colloided ester mass, a phenol ester which remains liquid at a temperature of 0° Cent. and a solvent common to both, alternating with layers composed of a mixture of viscose (cellulose xanthogenate) and the products obtained from Chinese wood oil and aromatic amins in the presence of a condensing agent.

3. The process for the manufacture of artificial leather and the like, which consists in coating suitable materials with layers composed of a mixture of a colloided ester mass, a phenol ester which remains liquid at a temperature of 0° Cent. acting as a softening agent, further softening agents, binding agents, filling substances and coloring matters, alternating with layers composed of a mixture of viscose (cellulose xanthogenate) and the products obtained from Chinese wood oil and aromatic amins in the presence of a condensing agent.

4. The process for the manufacture of artificial leather and the like, which consists in coating suitable materials with layers composed of a mixture of a colloided cellulose ester mass and orthotricresylphosphate alternating with layers composed of a mixture of viscose (cellulose xanthogenate) and the products obtained from Chinese wood oil and aromatic amins in the presence of a condensing agent.

5. As a new product artificial leather comprising a fabric coated with layers of a mixture of a colloided cellulose ester mass and a phenol ester which remains liquid at 0° Cent. alternating with layers composed of a mixture of viscose (cellulose xanthogenate) and the products obtained from Chinese wood oils and aromatic amins in the presence of a condensing agent.

In testimony whereof I have signed my name to this specification in the presence of two subscribing witnesses.

Dr. LEON LILIENFELD.

Witnesses:
HERMAN WUNDERLICH,
AUGUST FUGGER.